Figure 1:
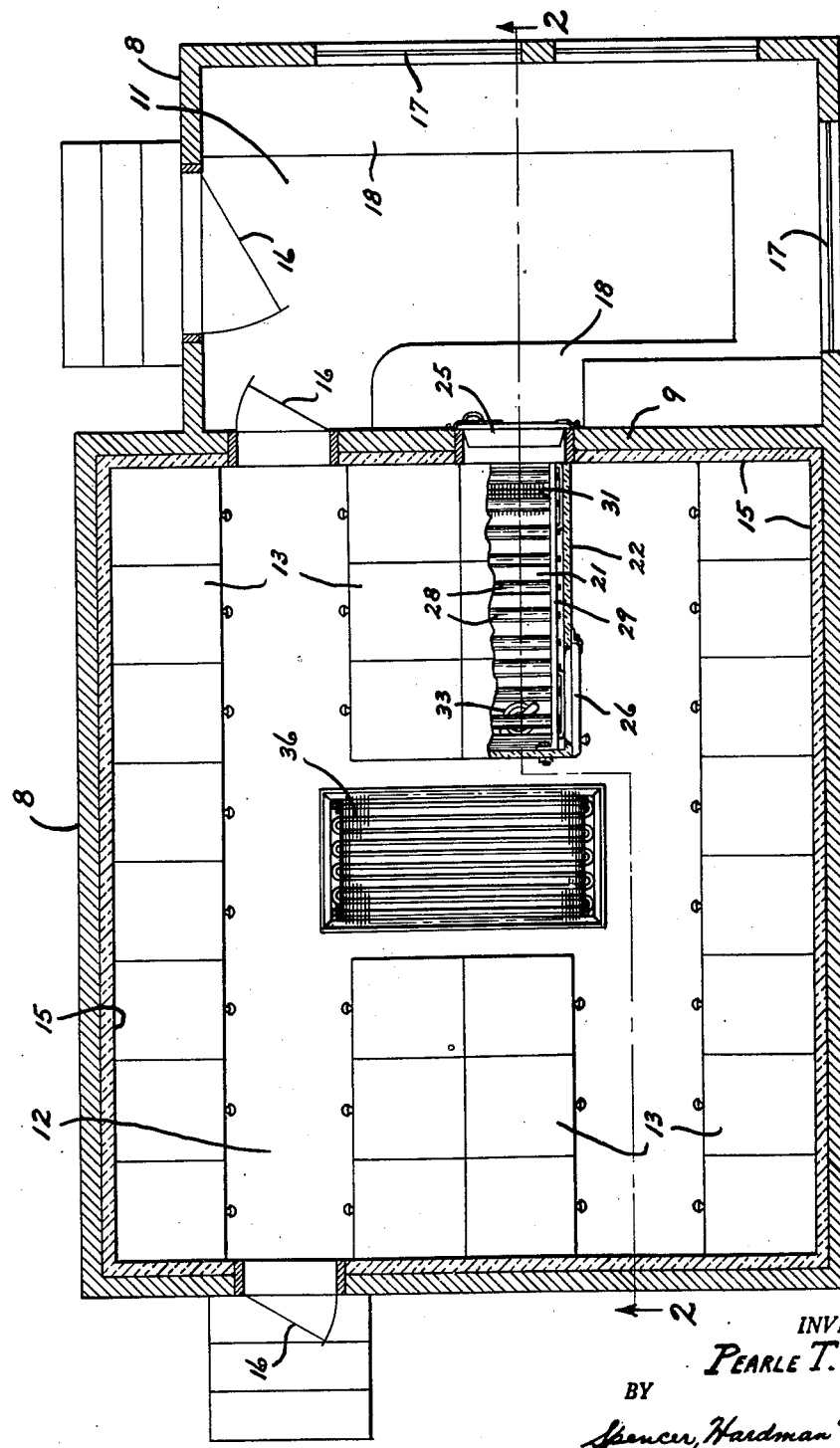

Oct. 11, 1949.  P. T. JUDE  2,484,572
FROZEN FOOD PLANT

Filed April 24, 1947  2 Sheets-Sheet 1

INVENTOR.
PEARLE T. JUDE.
BY
Spencer, Hardman & Zehr.
HIS ATTORNEYS.

Oct. 11, 1949.  P. T. JUDE  2,484,572
FROZEN FOOD PLANT

Filed April 24, 1947  2 Sheets-Sheet 2

INVENTOR.
PEARLE T. JUDE.
BY
Spencer, Hardman & Fehr.
HIS ATTORNEYS.

Patented Oct. 11, 1949

2,484,572

UNITED STATES PATENT OFFICE 2,484,572

FROZEN FOOD PLANT

Pearle T. Jude, Minneapolis, Minn., assignor to General Motors Corporation, Dayton, Ohio, a corporation of Delaware Application April 24, 1947, Serial No. 743,497

2 Claims. (Cl. 62—89)

This invention relates to refrigeration and particularly to locker plants wherein frozen articles are placed for cold storage.

Ordinarily a cold storage locker plant or building comprises a refrigerated room in which is located a plurality of individual lockers for the reception and storage of frozen articles, a non-refrigerated processing room in which meat is cut up and prepared for freezing and a sharp freezing room maintained at a very low temperature for receiving the meat cuts or other articles to be frozen prior to removal to lockers in the cold storage room. It has been the practice to provide access to the various rooms of such a locker plant by door openings of a size permitting a person to walk therethrough. Thus the operator or plant attendant, after cutting up meat or preparing other articles in the processing room to be frozen, has been required to carry the articles into the sharp freezing room. This has been very objectionable because the attendant of such a plant, in passing from the relatively warm processing room into the sharp freezing room, is subjected to extreme temperature changes which imperils the attendant's health. My invention is directed particularly to a cold storage locker plant arrangement wherein the foregoing objection is eliminated.

An object of my invention is to provide an improved cold storage locker plant.

Another object of my invention is to provide an arrangement of elements in a cold storage locker plant which will permit the plant attendant to place articles in the sharp freezing zone thereof without being subjected to extreme temperature changes or to the low temperature of the sharp freezing zone.

In carrying out the foregoing objects it is a further and more specific object of my invention to provide a cold storage locker plant with a sharp freezing compartment having a first service doorway permitting articles to be placed therein from within a processing room of the plant and a second service doorway permitting removal from the compartment of the frozen articles from within a locker room of the plant.

Further objects and advantages of the present invention will be apparent from the following description, reference being had to the accompanying drawings, wherein a preferred form of the present invention is clearly shown.

Figure 2:
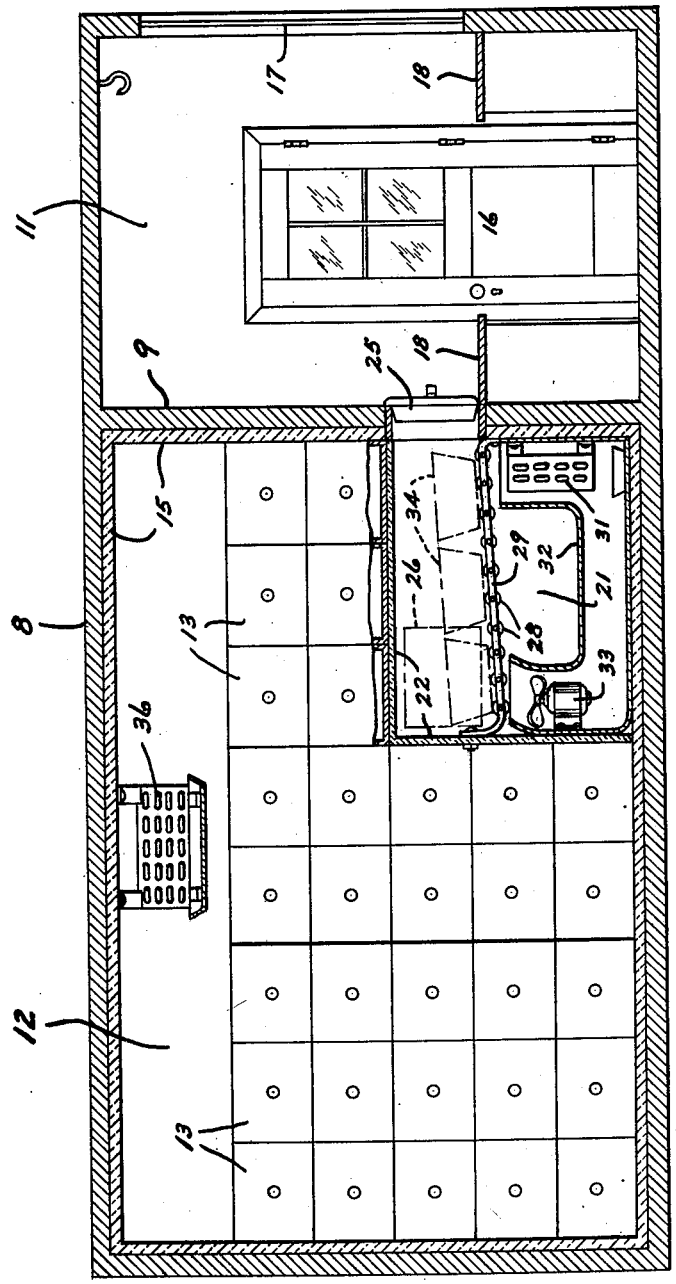

In the drawings:

Fig. 1 is a view partly in plan and partly in horizontal section illustrating the invention; and Fig. 2 is a vertical sectional view taken on the line 2—2 of Fig. 1.

Referring to the drawings, a building or plant, defined by the walls 8, is divided by a wall 9 into a processing room 11, maintained at a temperature above freezing, in which articles or products are prepared to be frozen in a sharp freezing zone and a relatively large cold storage room 12 in which is located a plurality of lockers 13 for individual customer use and wherein the air is cooled to below freezing temperatures. The individual storage lockers or compartments 13 may be of any well known construction. For example, they may be in the form of slidable drawers and are usually provided with key actuated or combination locks. The walls 8 of locker room 12 may be lined with any suitable or desirable insulating material 15. Door openings of a size permitting the passage of a person therethrough and normally closed by doors indicated at 16 may be provided for customer entrance into the locker room 12 and into the processing room 11 from the exterior of the plant, and also between the locker room and the processing room. Processing room 11 may be provided with suitable windows 17 and work tables or ledges 18.

In the present disclosure I provide a sharp freezing zone or compartment 21 within the locker room 12. Compartment 21 is formed by a casing 22 and some lockers 13 may be located above this casing while others may be located in back of the casing 22. The walls of compartment 21 may, if desired, be formed of or lined with any suitable insulating material. A service doorway 25 in the one wall of sharp freezing compartment 21, the wall forming the partition between rooms 11 and 12, provides communication between the processing room 11 and the interior of compartment 21. Another service doorway 26 provided in the front wall of casing 22 and spaced from the doorway 25 affords communication with the interior of sharp freezing compartment 21 from within the locker room 12. The doorways 25 and 26 are small as compared to the doors 16 and are to be distinguished therefrom in the present disclosure and in prior known structures in that they are substantially table-high service doorways only and permit passage therethrough of relatively small objects or packages. A conveyor device in the form of a plurality of rollers 28 are mounted upon a suitable support 29 within the sharp freezing compartment 21 and these rollers bridge the space between the service doorways 25 and 26. The roller support 29 is mounted so as to incline the plurality of rollers 28 upwardly from the doorway 26 toward the doorway 25 for a purpose to be hereinafter described. While I have shown the conveyor device as comprising rotatable rollers it is to be understood that this device may be in the form of a continuous belt or other conventional apparatus.

In order to cool the interior of sharp freezing compartment 21 an evaporator 31 connected to any suitable or conventional refrigerating system (not shown) is mounted in a shroud 32 within compartment 21. A blower or fan operated by a motor 33 located within shroud 32 draws air over the evaporator 31 to cool same and forces the cold air over articles contained in wire baskets or the like indicated at 34 and adapted to be supported on the rollers 28. In order to cool the locker storage room 12 an evaporator 36 connected to any suitable or conventional refrigerating system (not shown) is suspended from the ceiling of room 12 and if forced air cooling is desired within this room a blower or fan may be associated with evaporator 36 in the well known manner for circulating air thereover. Suitable or conventional controls may be employed for starting and stopping operation of the refrigerating apparatus or systems to which the evaporators 31 and 36 are connected to cause evaporator 36 to cool the air within locker room 12 to a temperature below freezing and to cause evaporator 31 to cool the air within sharp freezing compartment 21 preferably far below the below freezing temperature maintained in room 12.

In the use of the plant disclosed a locker customer will bring meat to the attendant of the plant who will take the meat into the processing room 11 and cut it up into the desired pieces to provide the customer with steaks, roasts and the like. The piece of meat or meat cuts are wrapped in suitable material for storing the same in cold storage and are placed in the wire or the like baskets 34. The plant attendant will then open the doorway or service door 25 and place a filled basket or baskets 34 upon the conveyor device or rollers 28 from within the processing room. In this manner much time is saved because the necessity of the plant attendant to carry the articles from the processing room into the freezing room is eliminated and the plant attendant is not exposed to the sub-freezing temperature within a freezing room. Weight of the contents of a basket 34, after being placed on the conveyor device, causes the basket to move or slide downwardly on the inclined conveyor device into a position adjacent the service doorway 26. Other baskets will be supported within the freezing compartment 21 on the conveyor rollers 28 in the space intermediate the doorways 25 and 26. Operation of the refrigerating system to which evaporator 21 is connected and motor 33 may have been previously started and the low temperature of air circulated over or about the meat or other articles within the baskets 34 will quickly freeze same. After the meat or other articles have been permitted to remain in the sharp freezing compartment 21 for a predetermined period of time to become frozen the doorway or door 26, accessible from within room 12, is opened and the baskets 34 containing the wrapped frozen articles are removed from compartment 21. The baskets are emptied and the frozen articles may then be placed directly into the customer's individual locker 13 within room 12 for cold storage.

In view of the foregoing it will be apparent that I have provided an improved locker plant wherein the plant attendant may place articles in a freezing zone to be frozen from within the processing room and without being subjected to the low temperature of the freezing zone or compartment. By locating the freezing compartment within the locker storage room which is maintained below 32° F. this compartment never attains a temperature above freezing. Consequently the temperature within the freezing compartment may be reduced to that suitable for fast freezing in a few moments after the arrival of a customer and while the customer's meat or other articles to be frozen are being processed and wrapped for freezing. Thus the expense of maintaining the temperature of the freezing compartment at all times far below freezing is eliminated. The arrangement of elements of the locker plant as disclosed not only eliminates imperilling of the plant attendant's health but also facilitates the operation of handling, processing, freezing and storing of meats or other articles.

While the form of embodiment of the invention as herein disclosed, constitutes a preferred form, it is to be understood that other forms might be adopted, as may come within the scope of the claims which follow.

What is claimed is as follows:

1. A locker plant comprising in combination, a cold storage locker room, means for cooling said locker room to a temperature below freezing, a sharp freeze compartment within said cold storage locker room for receiving articles to be frozen prior to removal to lockers in said locker room, means for cooling said sharp freeze compartment to a temperature below the below freezing temperature of said locker room, a processing room adjacent said sharp freeze compartment wherein articles are prepared for freezing in said compartment and wherein a temperature above freezing is maintained, said sharp freeze compartment having a service doorway providing communication with said processing room for permitting a person to place articles prepared in said processing room into said compartment without being subjected substantially to the low temperature therein, said sharp freeze compartment also having another service doorway spaced from said first service doorway and adapted to provide communication with said cold storage locker room, a conveyor device within said compartment bridging the space between said spaced apart service doorways for receiving and supporting articles placed into the compartment through said first named doorway and for conveying same into a position adjacent said another compartment service doorway, and said another service doorway permitting articles frozen in said compartment to be removed therefrom and directly placed into lockers in said cold storage locker room.

2. A locker plant comprising in combination, a cold storage locker room, means for cooling said cold storage locker room to a temperature below freezing, a sharp freeze compartment within said cold storage locker room for receiving articles to be frozen prior to removal to lockers in said room, means for cooling said sharp freeze compartment to a temperature below the below freezing temperature of said locker room, a processing room adjacent said sharp freeze compartment wherein articles are prepared for freezing in said compartment and wherein a temperature above freezing is maintained, said sharp freeze compartment having a service doorway communicating with the interior of said locker room, and said sharp freeze compartment also having another service doorway communicating with the interior of said processing room whereby a person may place articles prepared in said processing room into said compartment without being subjected substantially to the low temperature therein.

PEARLE T. JUDE.

REFERENCES CITED

The following references are of record in the file of this patent:

UNITED STATES PATENTS

| Number | Name | Date |
| --- | --- | --- |
| 1,753,828 | Greer et al. | Apr. 8, 1930 |
| 1,955,669 | Botz | Apr. 17, 1934 |
| 2,145,323 | Stafford | Jan. 31, 1939 |
| 2,165,513 | Smith | July 11, 1939 |
| 2,259,803 | Cumming | Oct. 21, 1941 |
| 2,436,117 | Morgan | Feb. 17, 1948 |